United States Patent

Pollart et al.

[11] 3,806,161
[45] Apr. 23, 1974

[54] TRAILER HITCH ADAPTER

[76] Inventors: Gary M. Pollart, P.O. Box 1558;
George O. Fenton, 412 E. 18 St.,
both of Guymon, Okla. 73942

[22] Filed: July 21, 1972

[21] Appl. No.: 273,831

[52] U.S. Cl. .................................................. 280/500
[51] Int. Cl. ............................................... B60d 1/06
[58] Field of Search ........ 280/495, 500, 511, 415 A

[56] References Cited
UNITED STATES PATENTS
2,622,892  12/1952  Lowman ............................ 280/495
3,675,947   7/1972  Blagg ................................. 280/500

*Primary Examiner*—Robert R. Song
*Attorney, Agent, or Firm*—Jerry D. Dunlap

[57] ABSTRACT

This invention relates to an adapter connectable to truck bumpers and the like for facilitating the securement to the bumper of trailer hitches so that the point of securement is located at a lower level than the normal point of securement. The trailer hitch adapter includes a compound mounting plate which is securable to the under side of the hitch plate portion of a bumper for a truck or other vehicle, and a block structure which is configured to slidingly engage the mounting plate to form an interconnection between the block and the mounting plate. The block structure has projecting from one side thereof, a tongue plate which has a ball hitch mounted on the upper side of such plate, for connection with the socket of a trailer tongue. The block structure and compound mounting plate each carry apertures which register with each other and with an aperture through the hitch plate of the truck bumper when the block structure and mounting plate are fully interengaged. A pin is passed through the registering apertures to prevent relative movement between the block and the mounting plate.

4 Claims, 6 Drawing Figures

PATENTED APR 23 1974 3,806,161

TRAILER HITCH ADAPTER

BACKGROUND OF THE INVENTION

1. Field of the Invention

This invention relates to trailer hitches, and more particularly, to a trailer hitch adapter which is detachably connectable to a truck bumper or the like to permit the point of connection of a trailer hitch to the bumper to be lowered with respect to the normal point of connection thereof.

2. Brief Description of the Prior Art

A great many types of trailer hitches have heretofore been developed for coupling various types of trailer vehicles to automobiles, trucks or the like. In many of these types of hitches, a spherical (ball) member is provided on the bumper of the towing vehicle, and the connection is effected by placing over this ball, a mating socket carried at one end of a tongue or yoke secured to the front end of the trailer to be towed. Since bumpers of trucks and automobiles tend to be located at somewhat standard or fixed heights above the ground, the location of the ball portion of the hitch connection also is usually within a relatively narrow range of distance above the ground. This results in an inability to accommodate, in an optimum fashion, all types of trailers which it may, on occasion, be desirable to pull or tow behind a towing vehicle.

Some proposals have heretofore been made to increase the versatility of towing capability by providing for more than one point of connection between the tongue of the trailer and the bumper of the towing vehicle. Structures of various types have been evolved for securement to the bumper to permit the angulation of the tongue of the trailer with respect to the towing vehicle to be varied to some extent. Nevertheless, these devices have usually been either expensive out of proportion to the flexibility and convenience afforded, or have been difficult to install and lack high reliability in use.

One of the problems frequently encountered as a result of the unavailability on the market of a simple, quickly installed trailer hitch connection is that of towing a stock trailer, and particularly a horse trailer, behind a pickup truck. The construction of horse trailers is frequently such that when the tongue of the trailer is connected at the usual or conventional point of connection to a ball carried on the truck bumper, the fore and aft (or front to rear) axis of the trailer is inclined rather steeply with respect to the horizontal, and the rear end of the trailer dips dangerously close to the ground. This is an inefficient towing position, and also is uncomfortable to the horses carried in the trailer.

BRIEF DESCRIPTION OF THE PRESENT INVENTION

The present invention provides a trailer hitch adapter which is economical in construction, and which can be quickly and easily mounted to a conventional pickup truck bumper for the purpose of lowering the point of connection between a yoke or tongue carried by the trailer and the bumper of the towing vehicle.

Broadly described, the trailer hitch adapter of the present invention includes a compound mounting plate which is adapted for securement by welding or bolting to the horizontal hitch plate forming a portion of a truck bumper. The mounting plate has a downwardly projecting flange plate portion which is configured to engage a complementary portion of a block structure forming a second major subassembly of the trailer hitch adapter of the invention. The block structure is constructed to slidingly engage the downwardly depending flange plate portion of the mounting plate to provide a strong interlocking connection between the block structure and mounting plate, yet facilitate rapid detachment of the block from the mounting plate. The block structure and mounting plate include aligned or registering holes or apertures which permit them to be pinned in interlocking relationship when the sliding engagement hereinbefore described has been effected. The block structure has secured thereto, or integrally formed therewith, a horizontally projecting hitch plate appendage or tongue which has secured to the upper side thereof, a hitch ball by which the trailer hitch adapter can be secured to the tongue or yoke of a conventional trailer.

An important object of the present invention is to provide a trailer hitch adapter which can be quickly mounted on, or secured to, the horizontal hitch plate located at the license well portion of a conventional bumper for pickup trucks and the like, and which is useful for permitting the point of connection of a trailer being towed behind such trucks to be lowered in relation to the ground.

An additional object of the present invention is to provide a trailer hitch adapter which can be quickly and easily placed in use, and which can be disassembled expeditiously at times when it is desirable to remove certain depending or downwardly projecting structure from the vehicle bumper to increase the clearance between the vehicle upon which it is mounted and the ground.

A further object of the invention is to provide a trailer hitch adapter which can be manually mounted on truck bumpers without the use of sophisticated tools, and which provides a mechanically strong connection between the tongue or yoke of a trailer to be towed and the bumper of the towing vehicle.

Additional objects and advantages of the invention will become apparent as the following detailed description of a preferred embodiment of the invention is read in conjunction with the accompanying drawing which illustrates the invention.

DETAILED DESCRIPTION OF A PREFERRED EMBODIMENT OF THE INVENTION

Figure 1:
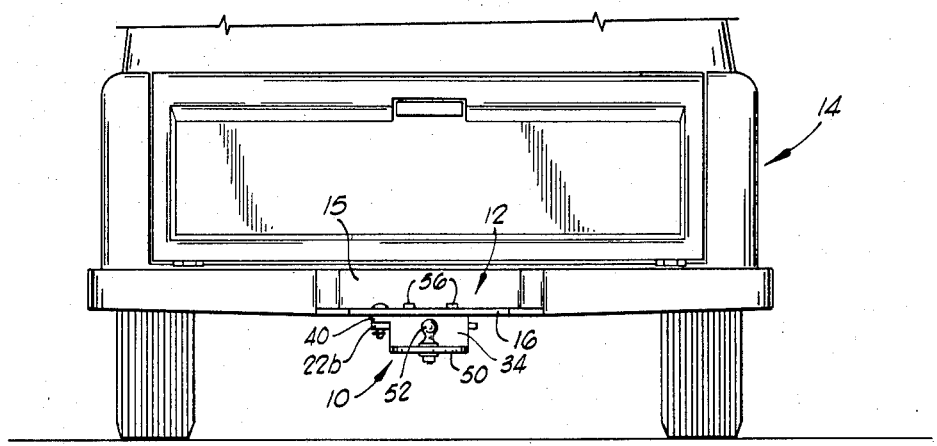
FIG. 1 is a rear elevation view of the trailer hitch adapter of the present invention as it appears when mounted to the bumper of a pickup truck.
Figure 2:
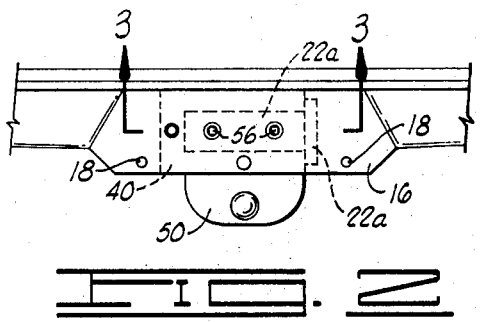
FIG. 2 is a plan view of the hitch adapter mounted on the truck bumper.

Referring initially to FIG. 1 of the drawings, shown therein is the trailer hitch adapter 10 of the present invention as the adapter appears when mounted on a bumper 12 carried on a pickup truck 14. In conventional fashion, the bumper 12 includes a license plate well 15, at the lower side of which is located a hitch plate 16. The hitch plate 16 has the usual plurality of apertures 18 (see FIG. 2) for the purpose of permitting a hitch ball to be secured to the hitch plate.

The trailer hitch adapter 10 of the present invention includes, in the illustrated embodiment, a compound mounting plate 22 having a central, top plate portion 22a which may be welded to the hitch plate 16 of the bumper 12, or may be bolted thereto as hereinafter described. A lower plate flange portion 22b is secured to, or formed integrally with, the lower side of the central, top plate portion 22a and is larger than the central portion 22a to provide a projecting flange extending horizontally from every side of the central portion 22a. A securing pin aperture or hole 24 is formed in the lower plate flange portion 22b at a location where it projects horizontally from the central, top plate portion 22a of the plate 22. The function of the hole or aperture 24 will be hereinafter explained.

A second major subassembly of the trailer hitch adapter 10 of the invention is a block structure 30. The block structure 30 includes a chamber 32 which is defined within a box formed by a pair of opposed, substantially parallel side wall plates 34, an end plate 36 and an end plate 37. At the tops of the side wall plates 34, a pair of horizontally extending, aligned flange plates 38 project inwardly over the opening or chamber 32 and define between them, an elongated slot. The size of the slot between the flange plates 38 is such that the central, top plate portion of the compound mounting plate 22 can pass through this slot when the hitch plate adapter is assembled as hereinafter described. A slot or space 39 is provided between the end plate 37 and the flange plates 38.

Projecting from the end of the block structure 30 over the end plate 36 is a horizontally extending flange plate 40 which carries a central or hole 42 which is positioned for alignment or registration with the pin hole or aperture 24 in the flange portion 22b of the compound mounting plate 22 when the hitch plate adapter is assembled. A slot 43 is defined between the flange plate 40 and the end plate 36 and is of substantially the same width as the slot 39 between the flange plates 38 and the end plate 37. The chamber 32 is closed at its bottom by a bottom plate 44. The end plates 36 and 37 are relieved in the center of the upper edges thereof to accomodate the threaded ends of bolts which may be passed through the plate 22 for the purpose of securing it to the hitch plate 16 of the bumper, and which may carry thereon, suitable or appropriate securing nuts.

Projecting from the lower side of one of the side walls 34 in alignment with the bottom plate 44 of the block structure 30 is a tongue plate or hitch plate appendage 50. The hitch plate appendage 50 has welded, or otherwise suitably secured thereto, and projecting from the upper surface thereof, a hitch ball 52. It may here be pointed out that the entire block structure 30 may be formed from a single piece of metal by appropriate machining methods, and the hitch ball 52 then secured to the hitch plate appendage 50. Alternatively, the block 30 may be built up by welding the several side walls 34, end walls 36 and 37, flanges 38 and 40, and bottom wall 44 together at appropriate weld lines.

When the trailer hitch adapter 10 is to be utilized for the purpose of modifying the point of connection of the tongue or yoke of a trailer to a towing vehicle, the compound mounting plate 22 is first to the underside of the regular hitch plate 16 of the bumper 12. This may be done, as previously indicated, by welding or by bolting, or by the use of threaded stud bolts. In the illustration of the use of the invention portrayed in the drawings, the compound mounting plate 22 has been bolted to the underside of the hitch plate 16 by extending bolts 56 through the plate 22 and securing it in position by the use of nuts threaded on the lower ends of the bolts. With the plate 22 in this position, the flange portion 22b of the plate 22 projects horizontally and defines with the lower side of the hitch plate 16, horizontally extending grooves or channels.

Figure 3:
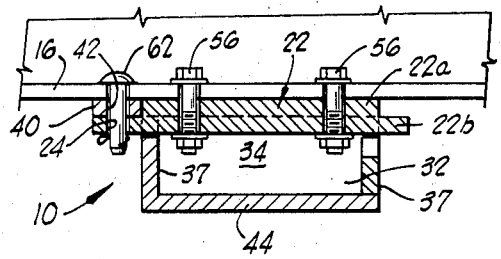
FIG. 3 is a sectional view along line 3—3 of FIG. 2.
Figure 5:
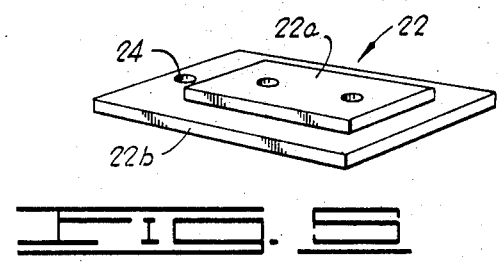
FIG. 5 is a perspective view of the compound mounting plate forming a portion of one embodiment of the trailer hitch adapter of the invention.
Figure 4:
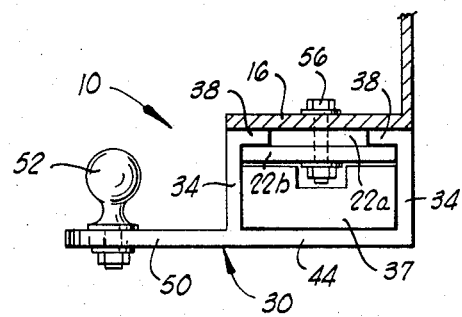
FIG. 4 is a side elevation view of the trailer hitch adapter of the invention.
Figure 6:
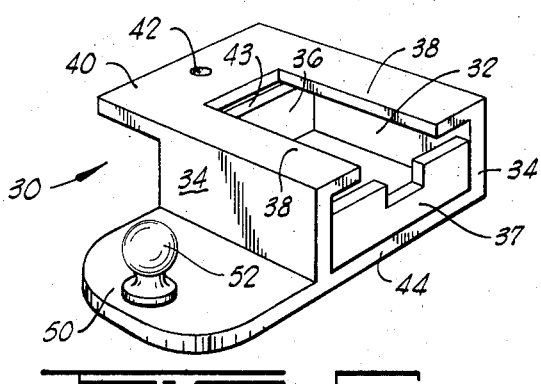
FIG. 6 is a perspective view of a block structure forming a portion of one embodiment of the invention.

The block structure 30 is then engaged with the plate 22 by sldiing the block over the lower plate flange portion 22b of the compound plate 22 so that the flange plates 38 forming a portion of the block structure extend into the channels defined between the flange portions 22b and the hitch plate 16. This relationship is depicted in FIG. 4. The sliding engagement is effected by sliding the block structure 30 all the way to the point where the top plate portion 22a of the compound plate 22 abuts the flange plate 40 of the block structure. When the abutment between the top plate portion 22a and the flange plate 40 of the block structure 30 exists in this manner, the aperture 42 carried in the flange plate 40 of the block structure is aligned, or in registry, wih the pin aperture 24 formed in the lower plate flange portion 22b of the compound plate 22. With this orientation between the block structure 30 and the compound plate 22 as depicted in FIG. 3, the hitch plate appendage 50 extends rearwardly with respect to the vehicle 14, and the hitch ball 52 projects upwardly in a position for ready engagement with the socket carried at the forward end of the tongue or yoke secured to the forward portion of a trailer to be towed. It will be noted in referring to FIG. 1 that the arrangement locates the hitch ball 52 at a substantially lower level than a ball mounted in conventional fashion on the hitch plate 16 of the bumper 12 would be located. Thus, the point of connection of the tongue of the trailer to the towing vehicle has been lowered. The block structure 30 is maintained in its relation to the compound mounting plate 22 by passing a connecting pin 62 through a suitable aperture 64 formed through the hitch plate 16 of the bumper 12, and through the registering apertures 24 and 42 of the compound mounting plate 22 and block structure 30, respectively.

When the hitch adapter 10 is mounted in the manner described, a very strong mechanically rigid connection is formed between the block structure 30 and the mounting plate 22. This is due to the fact that the large expense of metal constituted by the compound mounting plate 22 actually carries and transmits the load imposed when the trailer is connected to the towing vehicle. One of the important advan-tages of the trailer hitch adapter 10 of the present invention is the ease and facility with which it can be quickly secured to a conventional truck bumper. When the mounting plate 22 is welded to the lower side of the hitch plate 16, this portion of the adapter is, of course, permanently retained on the bumper. The block structure 39, however, can be quickly detached from the compound mounting plate 22 by simply removing the pin 62 to permit the block structure to be slidingly removed from the mounting plate in the opposite direction from the direction of movement used when it is secured in place for towing purposes. With the removal of the block structure 30 in the manner described, there is no downwardly projecting protuberance to scrape the ground when the truck passes over high centers in country roads or lanes, or in traversing rough terrain. Any slight downward projection can be further removed when the arrangement employed involves the bolting of the compound mounting plate 22 to the lower side of the hitch plate 16. When this method of securement is used, this plate can also be quickly and easily removed from the conventional bumper.

Although a preferred embodiment of the invention has been herein illustrated and described in order to provide to those skilled in the art, an explanation and understanding of the basic principles which underlie the invention, it will be understood that various changes and innovations in the described structure can be effected without departure from such basic principles. Changes and innovations of this type are therefore deemed to be circumscribed by the spirit and scope of the invention except as the same may be necessarily limited by the appended claims or reasonable equivalents thereof.

What is claimed is:

1. A trailer hitch adapter comprising:
a compound mounting plate including two plates flatly superimposed, with a portion of one plate projecting beyond the other plate;
a block structure slidably engageable with the projecting portion of said one plate, said block structure comprising a rigid box open at the top, and having aligned, spaced flange plates adjacent the top of the box and slidably engageable with the projecting portion of said one plate when said other plate is passed between said spaced flange plates and over the open top of the box;
a horizontally projecting tongue secured to one side of the block structure and projecting horizontally therefrom;
means for detachably interlocking said mounting plate and said block structure when said tongue plate projects horizontally at a location spaced vertically below said mounting plate; and
a hitch ball mounted on said tongue plate and projecting normal thereto and in an upward direction when said block structure and mounting plate are slidably engaged and detachably interlocked.

2. A trailer hitch adapter comprising:
mounting plate means adapted for securement to the hitch plate of a truck bumper and including substantially horizontally projecting flanges;
a block structure slidably engageable with said flanges and comprising:
a pair of substantially parallel side wall plates;
a bottom plate joining said side wall plates;
end plates extending normal to two opposed ends of the side wall plates and defining therewith and with said bottom plate, a box enclosing a chamber open at the top;
a pair of aligned, horizontally extending flange plates projecting toward each other from the top edges of said side wall plates and defining a slot there between receiving a central portion of said mounting plate means when the flanges of said mounting plate means are slidably passed beneath said flange plates of the block structure; and
a tongue plate projecting horizontally from one of said side wall plates along the lower edge thereof in a direction away from said bottom plate;
means for detachably interlocking said mounting plate means and said block structure when said tongue plate projects horizontally at a location spaced vertically below said mounting plate means; and
a hitch ball mounted on said tongue plate and projecting normal thereto and in an upward direction when said block structure and mounting plate means are slidably engaged and detachably interlocked.

3. A trailer hitch adapter comprising:
mounting plate means adapted for securement to the hitch plate of a truck bumper, and including flanges projecting in a horizontal direction for engagement with a block structure hereinafter described;
a block structure slidably engageable with the flanges of said mounting plate means, said block structure comprising a rigid hollow box open at the top and having flange plates adjacent the top positioned to slidably engage the flanges of the mounting plate means for sliding movement of the block structure in horizontal direction;
a horizontally projecting tongue plate projecting from one side of the box of the block structure;
means for detachably interlocking said mounting plate means in said block structure in a position such that said tongue plate projects horizontally at a location spaced vertically below said mounting plate means; and
a hitch ball mounted on said tongue plate and projecting normal thereto and in an upward direction when said block structure and mounting plate means are slidably engaged and detachably interlocked.

4. In combination:
a vehicle bumper having a central well and a hitch plate positioned in the well;
mounting plate means detachably secured to said hitch plate and including horizontal flanges;
a slotted block structure receiving a portion of said mounting plate means and slidably engaging said flanges;
means detachably interlocking said mounting plate means and said block structure;
a tongue plate projecting horizontally from one side of said slotted block structure and positioned in a plane vertically lower than said hitch plate; and
a hitch ball mounted on said tongue plate and projecting normal and upwardly with respect thereto.

* * * * *